US012620540B2

(12) United States Patent
Nishimura et al.

(10) Patent No.: US 12,620,540 B2
(45) Date of Patent: May 5, 2026

(54) CONTACT DEVICE AND ELECTROMAGNETIC RELAY

(71) Applicant: Panasonic Intellectual Property Management Co., Ltd., Osaka (JP)

(72) Inventors: Tsukasa Nishimura, Hokkaido (JP); Yosuke Shimizu, Hokkaido (JP); Hironori Hounoki, Mie (JP); Kohei Fudo, Osaka (JP); Taeho Jang, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 18/553,180

(22) PCT Filed: Mar. 28, 2022

(86) PCT No.: PCT/JP2022/014792

§ 371 (c)(1),
(2) Date: Sep. 28, 2023

(87) PCT Pub. No.: WO2022/230516

PCT Pub. Date: Nov. 3, 2022

(65) Prior Publication Data

US 2024/0282540 A1 Aug. 22, 2024

(30) Foreign Application Priority Data

Apr. 28, 2021 (JP) ................................ 2021-076778

(51) Int. Cl.
*H01H 50/54* (2006.01)
*H01H 9/44* (2006.01)
(Continued)

(52) U.S. Cl.
CPC .......... *H01H 50/546* (2013.01); *H01H 9/443* (2013.01); *H01H 50/14* (2013.01); *H01H 50/56* (2013.01)

(58) Field of Classification Search
CPC ...... H01H 50/546; H01H 9/443; H01H 50/14; H01H 50/56; H01H 50/12; H01H 50/02
(Continued)

(56) References Cited

U.S. PATENT DOCUMENTS

2015/0077202 A1 3/2015 Enomoto et al.
2017/0069452 A1* 3/2017 Hiroki ................. H01H 50/546

FOREIGN PATENT DOCUMENTS

CN 104221119 A 12/2014
CN 105070591 11/2015
(Continued)

OTHER PUBLICATIONS

The EPC Office Action dated Apr. 25, 2025 for the related European Patent Application No. 22795433.6.
(Continued)

*Primary Examiner* — Shawki S Ismail
*Assistant Examiner* — Lisa N Homza
(74) *Attorney, Agent, or Firm* — Rimon P.C.

(57) ABSTRACT

This contact device includes: a first fixed terminal; a movable contactor configured to contact the first fixed terminal and separate from the first fixed terminal; a spring disposed below the movable contactor and formed of a metal; a holder including a bottom and disposed to position the bottom below the spring; and a resin member configured to cover a portion of the bottom of the holder. The holder has a higher thermal conductivity than a thermal conductivity of the resin member. The upper surface of the bottom of the holder
(Continued)

includes an exposed portion that is exposed from the resin member. The spring is in contact with the exposed portion of the bottom.

14 Claims, 9 Drawing Sheets

(51) Int. Cl.
*H01H 50/14* (2006.01)
*H01H 50/56* (2006.01)

(58) Field of Classification Search
USPC .......................................................... 335/132
See application file for complete search history.

(56) References Cited

FOREIGN PATENT DOCUMENTS

| | | | | |
|---|---|---|---|---|
| EP | 4261868 | A1 | | 10/2023 |
| JP | 2019-117809 | | | 7/2019 |
| JP | 2019117809 | A | * | 7/2019 |

OTHER PUBLICATIONS

International Search Report of PCT application No. PCT/JP2022/014792 dated Jun. 14, 2022.
English Translation of Chinese Search Report dated Mar. 17, 2026 forthe related Chinese Patent Application No. 202280029398.4.

* cited by examiner

CONTACT DEVICE AND ELECTROMAGNETIC RELAY

TECHNICAL FIELD

The present disclosure generally relates to contact devices and electromagnetic relays and more specifically relates to a contact device including a fixed terminal and an electromagnetic relay including the contact device.

BACKGROUND ART

The contact device disclosed in Patent Literature (PTL) 1 includes a fixed contact, a movable contactor, a spring bearing part, and a contact pressure spring provided between the movable contactor and the spring bearing part. The movable contactor contacts and separates from the fixed contact. In the contact device disclosed in PTL 1, when the movable contactor is in contact with the fixed contact, the movable contactor and the fixed contact conduct electricity therebetween.

CITATION LIST

Patent Literature

PTL 1: Unexamined Japanese Patent Publication No. 2019-117809

SUMMARY OF INVENTION

When an electric current flows between the movable contactor and the fixed contact, the movable contactor and the fixed contact generate heat.

A contact device according to one aspect of the present disclosure includes: a first fixed terminal; a movable contactor configured to contact the first fixed terminal and separate from the first fixed terminal; a spring disposed below the movable contactor and formed of a metal; a holder including a bottom and disposed to position the bottom below the spring; and a resin member configured to cover a portion of the bottom of the holder, wherein the holder has a higher thermal conductivity than a thermal conductivity of the resin member, an upper surface of the bottom of the holder includes an exposed portion that is exposed from the resin member, and the spring is in contact with the exposed portion of the bottom.

An electromagnetic relay according to one aspect of the present disclosure includes: the contact device, and an electromagnet device configured to causes the movable contactor to contact the first fixed terminal and cause the movable contactor to separate from the first fixed terminal.

DESCRIPTION OF EMBODIMENTS

Figure 1:
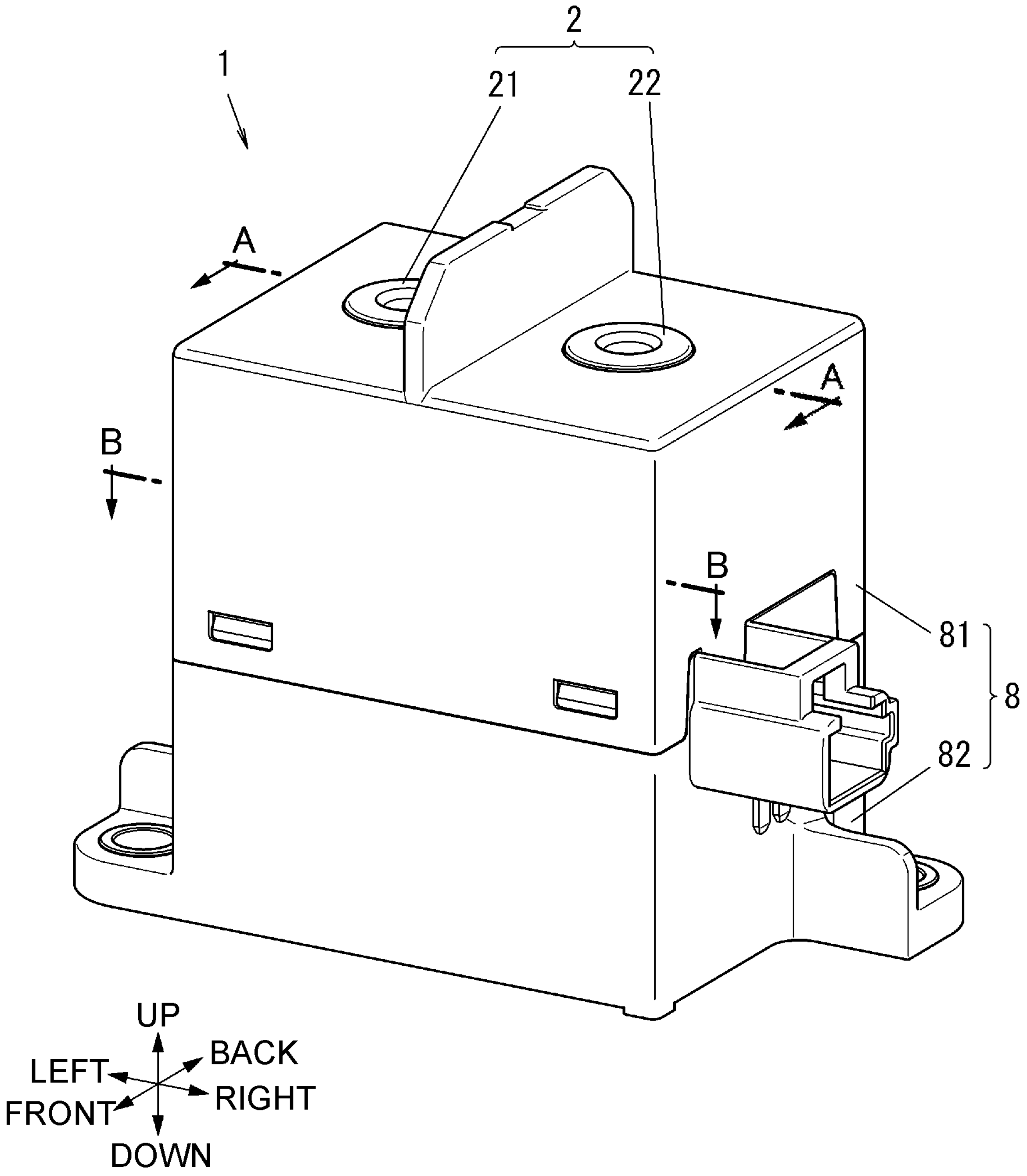
FIG. 1 is an overall perspective view of an electromagnetic relay according to one exemplary embodiment.

Hereinafter, a preferred exemplary embodiment of the present disclosure will be described in detail with reference to the drawings. Note that in the exemplary embodiment described below, identical elements are denoted by the same reference signs and overlapping description of the identical elements will be omitted. The following exemplary embodiment is merely one of various exemplary embodiments of the present disclosure. Various changes can be made to the exemplary embodiment according to the design or the like as long as the object of the present disclosure can be achieved. Each figure described in the present disclosure is a schematic diagram, meaning that the ratio between the sizes of structural elements in each figure and the ratio between the thicknesses of structural elements in each figure do not necessarily reflect an actual dimension ratio. Note that arrows indicating directions are one example and are not intended to define the direction of electromagnetic relay 1 when in use. Furthermore, the arrows representing directions in the drawings are illustrated for the sake of description and are not substantive.

(1) Outline

The outline of electromagnetic relay 1 according to the present exemplary embodiment will be described with reference to FIG. 1, FIG. 2, FIG. 4, and FIG. 6. Electromagnetic relay 1 illustrated in FIG. 1 is provided in an electric vehicle, for example. Electromagnetic relay 1 switches between supplying and not supplying an electric current from a power supply to a motor in the electric vehicle, for example.

Figure 2:
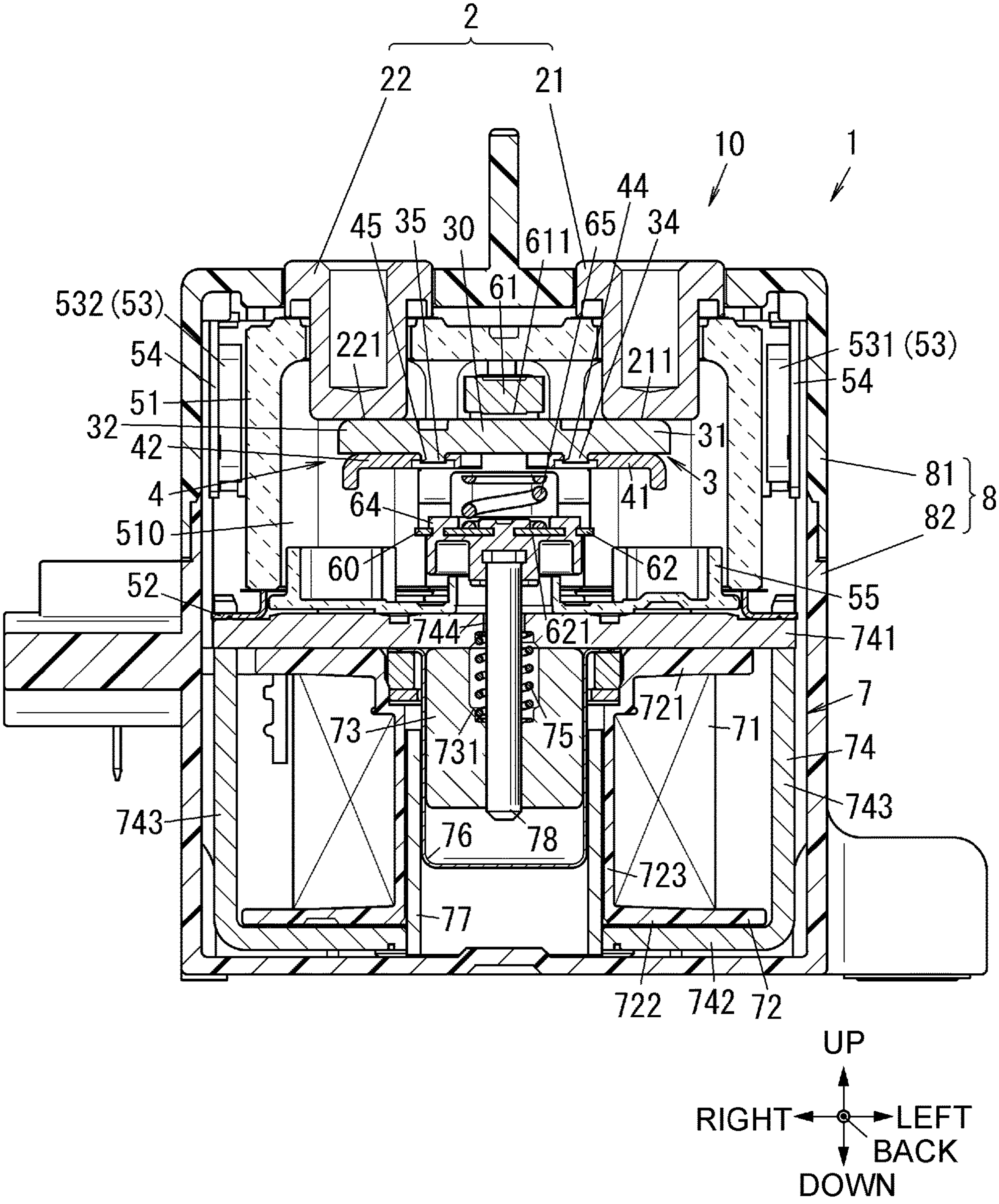
FIG. 2 is a cross-sectional view taken along line A-A of FIG. 1.

As illustrated in FIG. 2, electromagnetic relay 1 includes contact device 10 and electromagnet device 7. Contact device 10 includes fixed terminal unit 2, movable contactor 3, holder 60, resin member 64, and spring 65. Fixed terminal unit 2 includes: first fixed terminal 21 including first fixed contact 211; and second fixed terminal 22 including second fixed contact 221. Movable contactor 3 includes first movable contact 31 and second movable contact 32. Movable contactor 3 can move between a closed position in which first movable contact 31 is in contact with first fixed contact 211 and second movable contact 32 is in contact with second fixed contact 221 and an open position in which first movable contact 31 is separate from first fixed contact 211 and second movable contact 32 is separate from second fixed contact 221.

Figure 4:
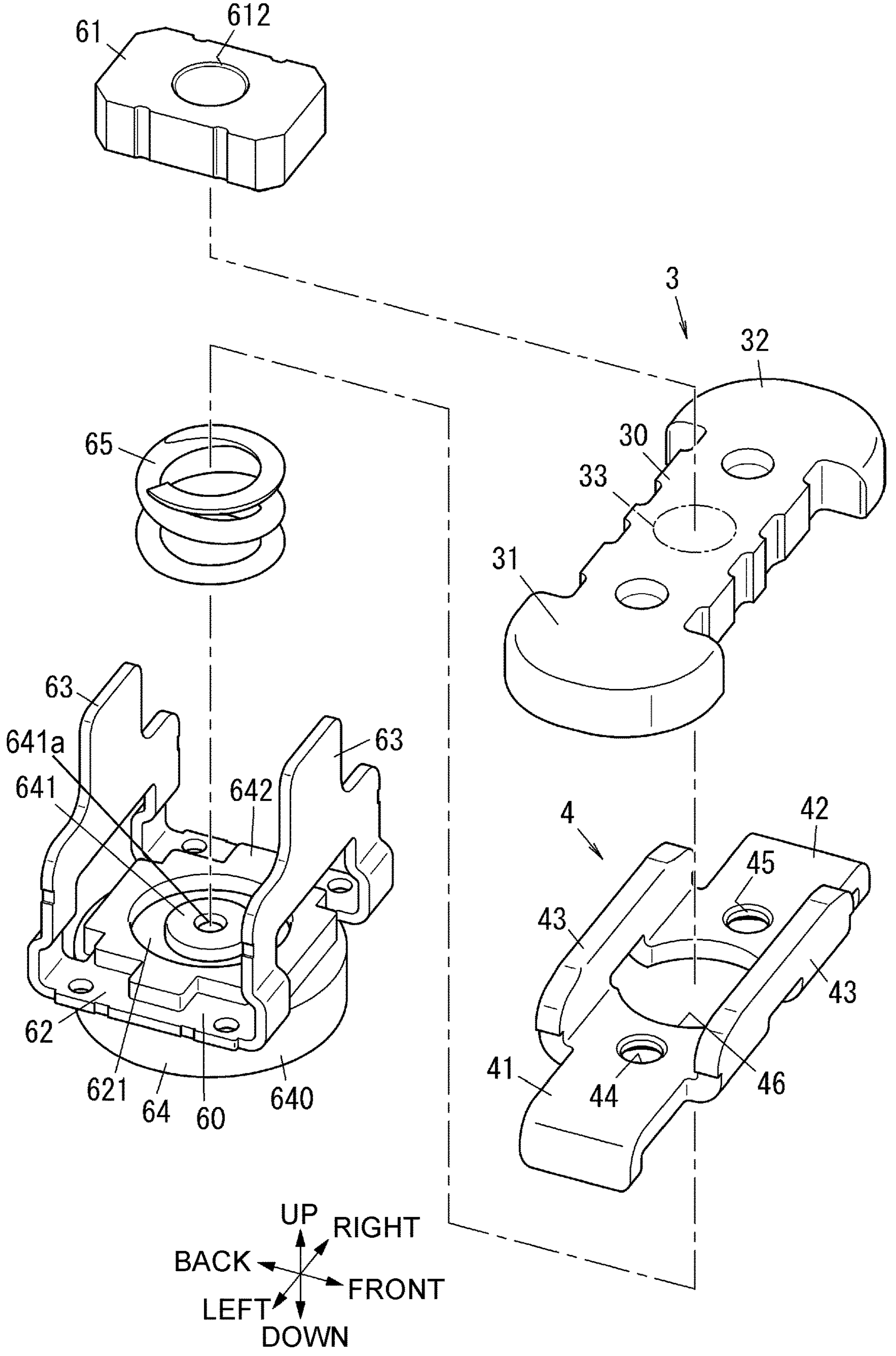
FIG. 4 is an exploded perspective view of main components of the contact device.

As illustrated in FIG. 4, holder 60 includes bottom 62. Bottom 62 includes exposed portion 621 which is a portion exposed from resin member 64. Although details will be described later, exposed portion 621 is located between first protrusion 641 and second protrusion 642 on the upper surface of bottom 62. Spring 65 is disposed between holder 60 and movable contactor 3 as viewed in the vertical direction and is in contact with exposed portion 621 of holder 60 and movable contactor 3.

Holder 60 according to the present exemplary embodiment is formed of a metal such as SUS304, for example. Therefore, the thermal conductivity of holder 60 is higher than the thermal conductivity of resin member 64. Since the lower end of spring 65 is in contact with exposed portion 621 of holder 60, contact device 10 can be provided with improved heat dissipation as compared to the case where the lower end of spring 65 is in contact with the resin member only, for example. Furthermore, since exposed portion 621 according to the present exemplary embodiment is a metal, contact device 10 can be provided with improved heat resistance and improved durability as compared to the case where the lower end of spring 65 is in contact with the resin member only.

(2) Details

Hereinafter, electromagnetic relay 1 according to the present exemplary embodiment will be described with reference to FIG. 2 to FIG. 9.

Note that a direction orthogonal to both the horizontal direction and the vertical direction is defined as a depth direction. Note that the "horizontal direction" in the present disclosure merely refers to a direction in which first fixed terminal 21 and second fixed terminal 22 are arranged. The "vertical direction" in the present disclosure merely refers to a direction in which movable contactor 3 moves. The "depth direction" in the present disclosure merely refers to a direction orthogonal to both the direction in which first fixed terminal 21 and second fixed terminal 22 are arranged and the direction in which movable contactor 3 moves. The terms "horizontal direction", "vertical direction", and "depth direction" used in the present disclosure are not intended to limit the directions of contact device 10 and electromagnetic relay 1 when in use.

The direction from first fixed contact 211 to first movable contact 31 is defined as "down", and the direction from first movable contact 31 to first fixed contact 211 is defined as "up". The direction from first fixed terminal 21 to second fixed terminal 22 is defined as "right", and the direction from second fixed terminal 22 to first fixed terminal 21 is defined as "left".

Each of the arrows representing left, right, up, down, front, and back in the figures, etc., is indicated for explanation only and is not substantive.

In other words, in the present disclosure, although description is given using terms indicating directions such as "up", "down", "left", "right", "front", and "back", these merely indicate relative positioning and do not limit the present disclosure. For example, when electromagnetic relay 1 according to the present disclosure is inclined upon installation, the direction of electromagnetic relay 1 when in actual use and the direction of electromagnetic relay 1 described in the present disclosure may be different.

(2.1) Structural Elements of Electromagnetic Relay

As illustrated in FIG. 2, electromagnetic relay 1 according to the present exemplary embodiment includes contact device 10 and electromagnet device 7. Electromagnet device 7 causes movable contactor 3 to contact and separate from fixed terminal unit 2. More specifically, electromagnet device 7 performs at least one of the operation of switching the position of movable contactor 3 to the closed position and the operation of switching the position of movable contactor 3 to the open position. Electromagnet device 7 according to the present exemplary embodiment includes coil 71 and, for example, when coil 71 is energized, switches the position of movable contactor 3 from the open position to the closed position by the electromagnetic action of coil 71. Furthermore, electromagnet device 7 includes return spring 75 and when coil 71 enters into a non-energized state, switches the position of movable contactor 3 from the closed position to the open position by the elastic force of return spring 75.

Electromagnetic relay 1 further includes housing 8. Housing 8 accommodates contact device 10 and electromagnet device 7.

Housing 8 includes first body 81 and second body 82. First body 81 is formed in the shape of a box having a lower surface with an opening portion. Second body 82 is formed in the shape of a box having an upper surface with an opening portion. First body 81 and second body 82 are joined together at the edges of the respective opening portions thereof.

(2.2) Structural Elements of Contact Device

As illustrated in FIG. 2, contact device 10 includes fixed terminal unit 2, movable contactor 3, magnetic shield 4, case 51, joining body 52, two permanent magnets 53, two bridge parts 54, blocking member 55, holder 60, yoke 61, resin member 64, and spring 65.

(2.3) Fixed Terminal Unit

As described above, fixed terminal unit 2 includes first fixed terminal 21 and second fixed terminal 22. First fixed terminal 21 and second fixed terminal 22 are arranged in the horizontal direction, and second fixed terminal 22 is located to the right of first fixed terminal 21. First fixed terminal 21 and second fixed terminal 22 are formed of an electrically conductive material such as copper. Each of first fixed terminal 21 and second fixed terminal 22 is disposed passing through first body 81 and case 51. Each of first fixed terminal 21 and second fixed terminal 22 has an upper end protruding from the upper surface of case 51 and the upper surface of first body 81 when joined to case 51 by brazing.

First fixed terminal 21 is in the shape of a cylinder having a lower surface. First fixed contact 211 is formed at the lower end of first fixed terminal 21. Note that first fixed contact 211 may be attached to the lower end of first fixed terminal 21. Second fixed terminal 22 is in the shape of a cylinder having a lower surface. Second fixed contact 221 is formed at the lower end of second fixed terminal 22. Note that second fixed contact 221 may be attached to the lower end of second fixed terminal 22.

(2.4) Movable Contactor

Movable contactor 3 is formed of an electrically conductive material such as copper, for example. Furthermore, movable contactor 3 is formed of a non-magnetic material. As illustrated in FIG. 4, movable contactor 3 include movable contactor body 30, first movable contact 31, second movable contact 32, and central portion 33. Movable contactor body 30 is formed flat. The thickness direction of movable contactor body 30 is the vertical direction. The longitudinal direction of movable contactor body 30 is the horizontal direction.

First movable contact 31 is provided in a left end portion of the upper surface of movable contactor body 30. In other words, first movable contact 31 according to the present exemplary embodiment is a portion of the upper surface of movable contactor body 30. Note that first movable contact 31 may be attached to the left end portion of the upper surface of movable contactor body 30. First movable contact 31 vertically faces first fixed contact 211. More specifically, first movable contact 31 is located below first fixed contact 211 (refer to FIG. 2).

Second movable contact 32 is provided in a right end portion of the upper surface of movable contactor body 30. In other words, second movable contact 32 according to the present exemplary embodiment is a portion of the upper surface of movable contactor body 30. Note that second movable contact 32 may be attached to the right end portion of the upper surface of movable contactor body 30. Second movable contact 32 vertically faces second fixed contact 221. More specifically, second movable contact 32 is located below second fixed contact 221 (refer to FIG. 2).

Central portion 33 is a portion of the upper surface of movable contactor body 30 that is located at the center and around the center in the depth and horizontal directions. Central portion 33 is a portion of the upper surface of movable contactor body 30 that is enclosed by the dashed-dotted line indicated in FIG. 4, for example.

When movable contactor 3 is in the open position, first fixed terminal 21 and second fixed terminal 22 do not conduct electricity therebetween. When movable contactor 3 is in the closed position (refer to FIG. 2), first fixed terminal 21 and second fixed terminal 22 conduct electricity therebetween via movable contactor 3.

As illustrated in FIG. 2, movable contactor 3 further includes first projection 34 and second projection 35 which protrude from the lower surface of movable contactor body 30. First projection 34 and second projection 35 are arranged in the horizontal direction, and second projection 35 is located to the right of first projection 34.

(2.5) Magnetic Shield

Magnetic shield 4 is formed of a magnetic material such as electromagnetic soft iron or steel plate cold commercial (SPCC), for example. The permeability of magnetic shield 4 is greater than the permeability of movable contactor 3.

As illustrated in FIG. 4, magnetic shield 4 includes first shield portion 41, second shield portion 42, and two joining portions 43. First shield portion 41 and second shield portion 42 are arranged in the horizontal direction, and second shield portion 42 is located to the right of first shield portion 41. First shield portion 41 is in the form of a rectangular plate. The left end of first shield portion 41 is bent downward. Second shield portion 42 is in the form of a rectangular plate. The right end of second shield portion 42 is bent downward.

First shield portion 41 is disposed below first movable contact 31. Second shield portion 42 is disposed below second movable contact 32. First shield portion 41 has fitting hole 44. Second shield portion 42 has fitting hole 45. First projection 34 (refer to FIG. 2) of movable contactor 3 is inserted into fitting hole 44, and second projection 35 (refer to FIG. 2) of movable contactor 3 is inserted into fitting hole 45; thus, magnetic shield 4 is connected to movable contactor 3.

Magnetic shield 4 is in contact with movable contactor 3. More specifically, the upper surface of first shield portion 41 and the upper surface of second shield portion 42 are in contact with the lower surface of movable contactor body 30.

Two joining portions 43 face each other in the depth direction. Two joining portions 43 are elongated in the horizontal direction. A left end portion of each of two joining portions 43 is connected to first shield portion 41, and a right end portion of each of two joining portions 43 is connected to second shield portion 42. One of two joining portions 43 is provided protruding upward from a front end portion of first shield portion 41 and a front end portion of second shield portion 42. The other of two joining portions 43 is provided protruding upward from a back end portion of first shield portion 41 and a back end portion of second shield portion 42.

Magnetic shield 4 has through-hole 46. Through-hole 46 is provided between first shield portion 41 and second shield portion 42. Spring 65 to be described later is inserted through through-hole 46.

(2.6) Holder

Figure 5:
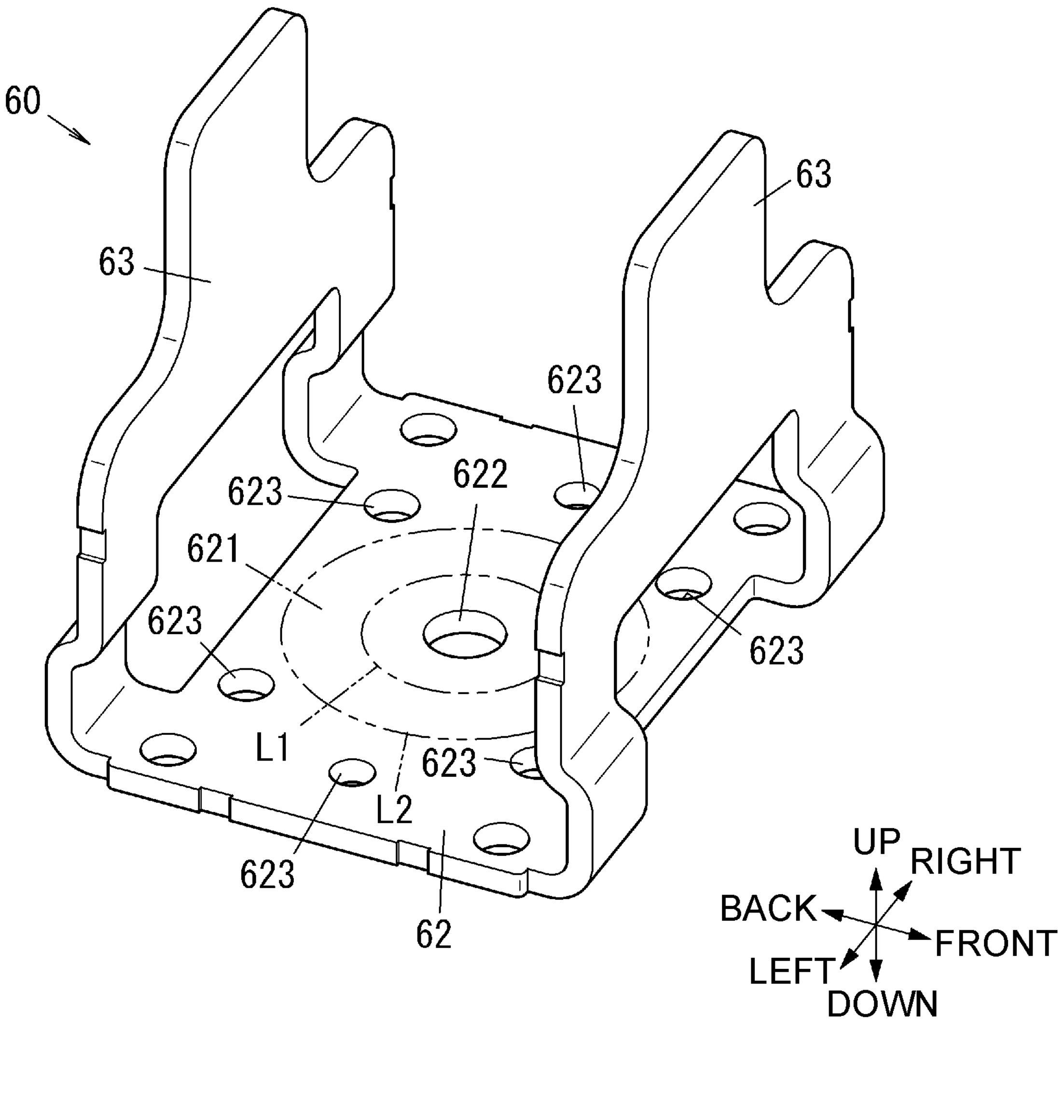
FIG. 5 is a perspective view of a holder of the contact device.

As illustrated in FIG. 5, holder 60 includes bottom 62 and a pair of side plates 63.

Bottom 62 is in the shape of a rectangular board. Bottom 62 includes exposed portion 621. Exposed portion 621 is a portion exposed from resin member 64 when the upper surface of bottom 62 is covered by first protrusion 641 and second protrusion 642 of resin member 64 (refer to FIG. 6). Exposed portion 621 is a ring-shaped portion sandwiched between dashed-double-dotted line L1 and dashed-double-dotted line L2 in FIG. 5, for example. Furthermore, bottom 62 has first hole 622 and a plurality of (in the example illustrated in FIG. 5, six) second holes 623. First hole 622 is a circular hole formed at a position that is the center of bottom 62 in the depth and horizontal directions. Six second holes 623 are circular holes formed on the circumference of a circle centered on first hole 622. First hole 622 and six second holes 623 are holes covered by resin member 64.

One of the pair of side plates 63 protrudes upward from a left portion and a right portion of the front end of bottom 62, and the other of the pair of side plates 63 protrudes upward from a left portion and a right portion of the rear end of bottom 62. The upper ends of the pair of side plates 63 are located higher than the upper surface of movable contactor 3 (refer to FIG. 2). The upper ends of the pair of side plates 63 are welded to yoke 61 (refer to FIG. 2).

Holder 60 according to the present exemplary embodiment is formed of a non-magnetic metal material. Examples of the non-magnetic metal material include aluminum and austenite stainless steel such as SUS304. A metal material generally has a higher thermal conductivity than a resin and therefore can improve the heat dissipation of exposed portion 621.

Holder 60 is formed from a single member. More specifically, bottom 62 and the pair of side plates 63 are formed by bending a single non-magnetic metal material. When holder 60 is formed from a single member, heat can be easily dissipated from bottom 62 to the pair of side plates 63. In other words, forming holder 60 from a single member allows for improved heat dissipation of exposed portion 621.

(2.7) Resin Member

Figure 6:
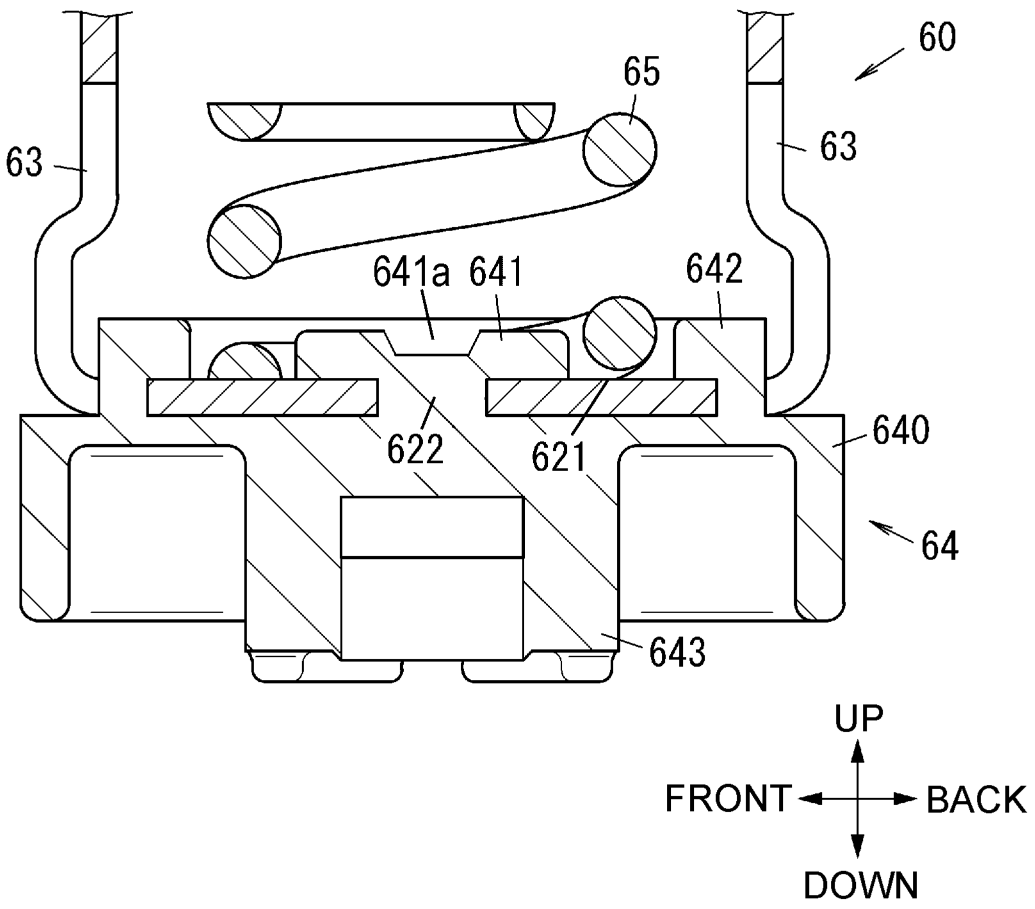
FIG. 6 is a cross-sectional view of main components of the contact device.

Next, resin member 64 will be described with reference to FIG. 4 and FIG. 6. Resin member 64 is formed of a synthetic resin, for example. As illustrated in FIG. 4, resin member 64 is formed integrally with holder 60 so as to cover a portion of the upper surface and the lower surface of bottom 62 of holder 60. Resin member 64 holds holder 60. As illustrated in FIG. 6, resin member 64 includes base 640, first protrusion 641, second protrusion 642, and connecting portion 643.

Base 640 is in the shape of a cylinder having an upper surface. Connecting portion 643 protrudes downward from the periphery of a central portion of base 640 that is located at the center in the depth and horizontal directions. Connecting portion 643 is in the shape of a tube and is connected to shaft 78 (refer to FIG. 2).

First protrusion 641 protrudes upward from the central portion of base 640 that is located at the center in the depth and horizontal directions, extends through first hole 622 of bottom 62, and protrudes higher than the upper surface of bottom 62. In a plan view from above, first protrusion 641 spreads out in the shape of a circle so as to cover a portion of the upper surface of bottom 62. As illustrated in FIG. 6, first protrusion 641 has a T-shaped cross-section. First protrusion 641 is surrounded by spring 65 in the plan view from above. In other words, first protrusion 641 is surrounded by spring 65 in the depth and horizontal directions. Stated differently, first protrusion 641 is located in the hollow area of spring 65.

Second protrusion 642 protrudes upward from base 640, extends through six second holes 623 (refer to FIG. 5) of bottom 62 and near bottom 62, and protrudes higher than the upper surface of bottom 62.

As illustrated in FIG. 4, second protrusion 642 is in the shape of a ring having a circular inner circumference in the plan view from above. Second protrusion 642 includes recess 641*a* (refer to FIG. 6); the inner circumference of recess 641*a* is concentric with the outer circumference of first protrusion 641, and the inner circumference of second protrusion 642 is greater in diameter than the outer circumference of first protrusion 641. Exposed portion 621 of bottom 62 is exposed between the outer circumference of first protrusion 641 and the inner circumference of second protrusion 642, and exposed portion 621 is ring-shaped.

(2.8) Spring

Spring 65 is, for example, a helical compression spring formed of a metal. Spring 65 is provided below movable contactor 3, but above bottom 62 of holder 60. Spring 65 is inserted into through-hole 46 of magnetic shield 4. Spring 65 is disposed between exposed portion 621 of bottom 62 and movable contactor 3 so as to be extended and retracted in the vertical direction. More specifically, the lower end of spring 65 is in contact with exposed portion 621 of bottom 62, and the upper end of spring 65 is in contact with movable contactor 3. Movable contactor 3 is sandwiched between spring 65 and yoke 61. Spring 65 functions as a contact pressure spring that applies an upward elastic force to movable contactor 3.

(2.9) Yoke

Yoke 61 is formed of a magnetic material. One example of the magnetic material is electromagnetic soft iron, steel plate cold commercial (SPCC), or the like. Yoke 61 is in the shape of a rectangular cuboid. Yoke 61 includes protrusion 611 (refer to FIG. 7) and recess 612. Recess 612 is formed in a central portion of the upper surface of yoke 61 that is located at the center in the depth and horizontal directions, and is depressed downward. In the plan view from above, recess 612 is in the shape of a circle.

Figure 7:
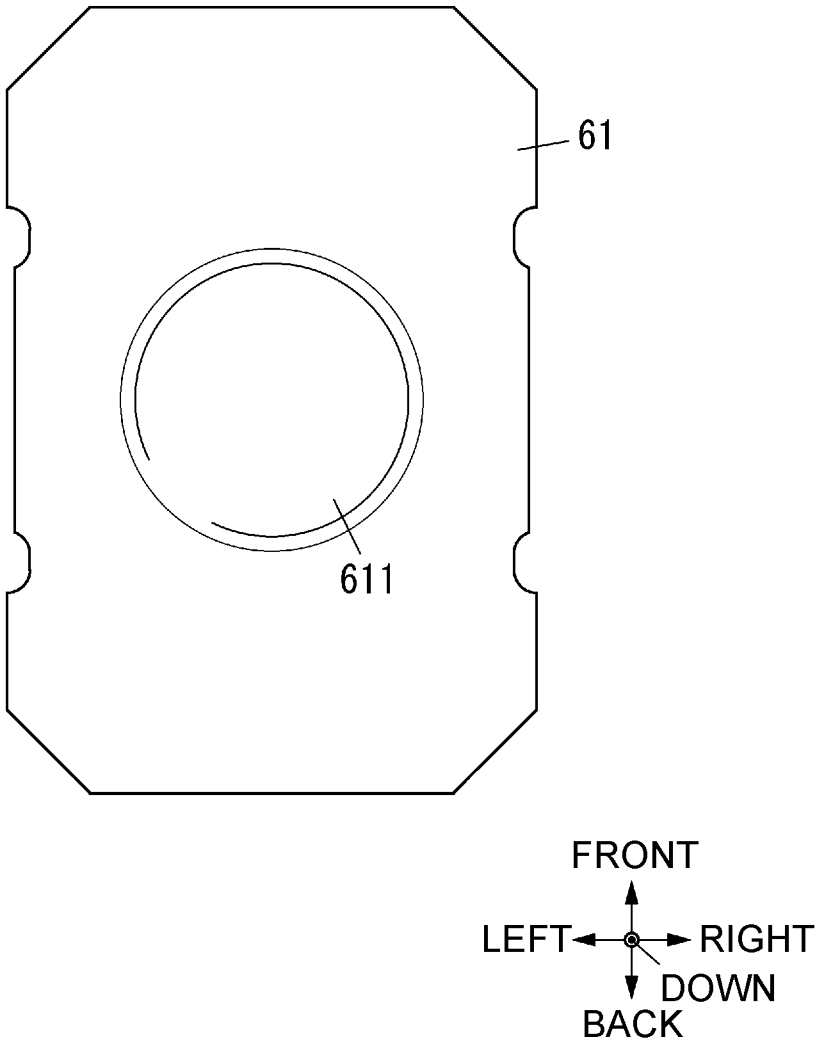
FIG. 7 is a bottom view of a yoke of the contact device.

As illustrated in FIG. 7, protrusion 611 is formed so as to protrude downward from a central portion of the lower surface of yoke 61 that is located at the center in the depth and horizontal directions. In the plan view from below, protrusion 611 is in the shape of a circle. At least a portion of protrusion 611 and recess 612 vertically overlap each other. Furthermore, at least a portion of protrusion 611 and shaft 78 (refer to FIG. 2) vertically overlap each other. Protrusion 611 vertically faces central portion 33 (refer to FIG. 4) of movable contactor 3. Note that the lower surface of protrusion 611 according to the present exemplary embodiment and the upper surface (central portion 33) of movable contactor 3 are parallel.

When yoke 61 and movable contactor 3 move downward, protrusion 611 according to the present exemplary embodiment comes into contact with central portion 33 (refer to FIG. 4) of movable contactor 3. In a conventional contact device, when a yoke and a movable contactor move downward, the movable contactor may wobble due to contact between the left end or the right end of the lower surface of the yoke and the movable contactor. Here, "wobble" include upward movement of a first movable contact relative to a second movable contact and downward movement of the first movable contact relative to the second movable contact. In contact device 10 according to the present exemplary embodiment, when movable contactor 3 moves downward, protrusion 611 (refer to FIG. 7) of yoke 61 comes into contact with central portion 33 of movable contactor 3 and thus, it is possible to reduce wobble of movable contactor 3.

Figure 8:
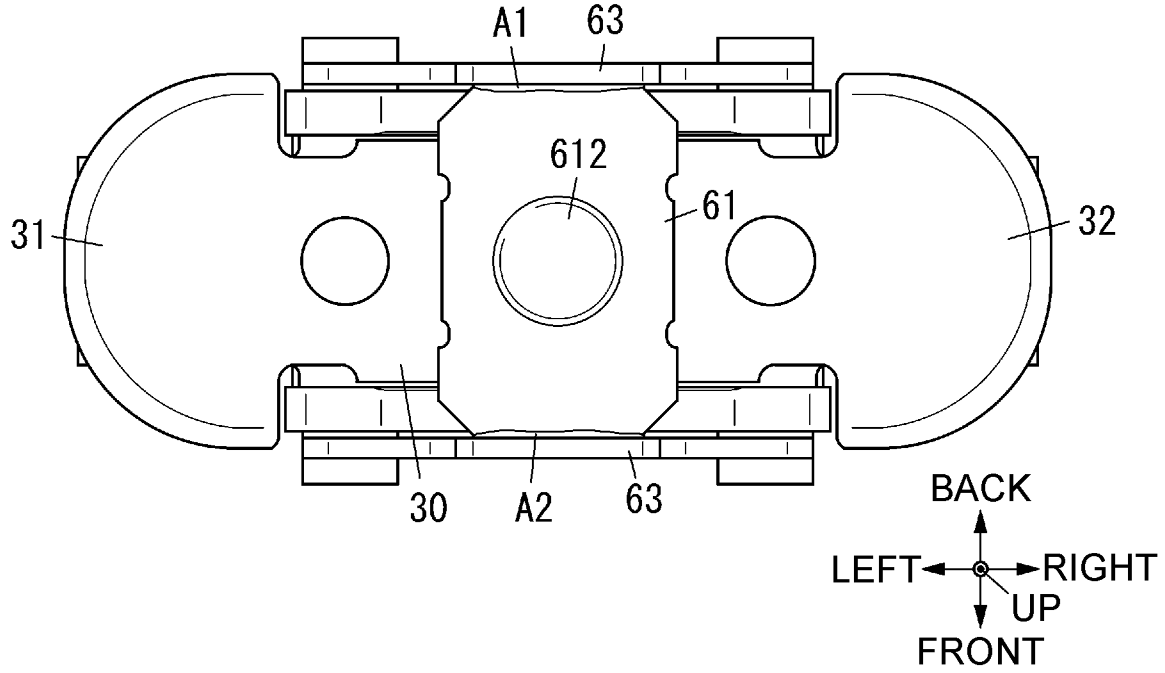
FIG. 8 is a top view of main components of the contact device.

As described above, yoke 61 is welded to the upper ends of the pair of side plates 63 of holder 60. Yoke 61 is located higher than the upper surface of movable contactor 3. As illustrated in FIG. 8, there are two welding traces A1, A2 between yoke 61 and the pair of side plates 63. Welding trace A1 located at the rear end of yoke 61 extends along an edge of the upper end of yoke 61 in the horizontal direction. Welding trace A2 located at the front end of yoke 61 extends along an edge of the lower end of yoke 61 in the horizontal direction.

As illustrated in FIG. 2, yoke 61 is located higher than the upper surface of movable contactor 3. When an electric current flows through movable contactor 3 and first and second fixed contacts 211, 221 (refer to FIG. 2) at the time of contact thereof, an electromagnetic repulsive force acts between movable contactor 3 and first and second fixed contacts 211, 221 due to this electric current.

Yoke 61 faces two joining portions 43 (refer to FIG. 4) of magnetic shield 4. Thus, with yoke 61 and magnetic shield 4, a magnetic circuit that surrounds movable contactor 3 is formed. When an electric current flows through first and second movable contacts 31, 32 and first and second fixed contacts 211, 221 at the time of contact thereof, a magnetic attractive force is generated between yoke 61 and magnetic shield 4. This restricts the operation of movable contactor 3 separating from first fixed contact 211 and second fixed contact 221. Thus, it is possible to reduce the likelihood that an electric arc will be generated between movable contactor 3 and each of first fixed contact 211 and second fixed contact 221.

(2.10) Case

Next, case 51 will be described with reference to FIG. 2. The material of case 51 is a heat-resistant material such as a ceramic. Case 51 is in the shape of a box with an open bottom. The internal space of case 51 is housing chamber 510 which accommodates first fixed contact 211, second fixed contact 221, and movable contactor 3. In other words, contact device 10 includes housing chamber 510. Housing chamber 510 contains an arc-extinguishing gas such as hydrogen. Note that housing chamber 510 does not need to be sealed and may be connected to the external environment.

(2.11) Joining Body

Joining body 52 is in the shape of a rectangular frame. Joining body 52 is joined to case 51 by brazing. Furthermore, joining body 52 is welded to yoke 74 included in electromagnet device 7. Thus, joining body 52 joins case 51 and yoke 74 together.

(2.12) Two Permanent Magnets

Figure 3:
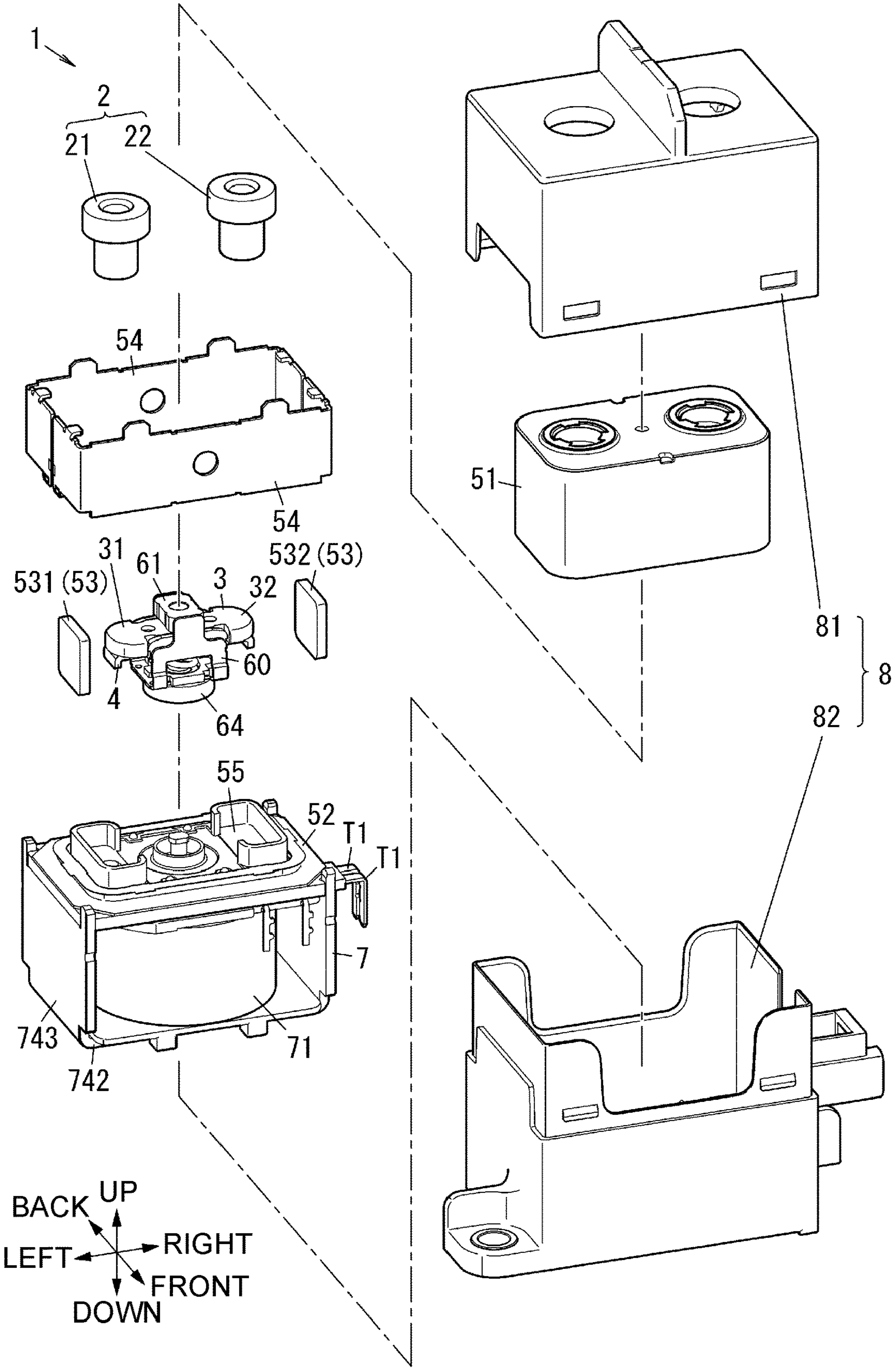
FIG. 3 is an exploded perspective view of the electromagnetic relay.

As illustrated in FIG. 2 and FIG. 3, two permanent magnets 53 are disposed and fixed between the outer surface of case 51 and the inner surface of housing 8. Two permanent magnets 53 are arranged in the horizontal direction. One of two permanent magnets 53 (a first magnet) is disposed in the left front area relative to first movable contact 31. The other of two permanent magnets 53 (a second magnet) is disposed in the right front area relative to second movable contact 32. Two permanent magnets 53 overlap at least a portion of magnetic shield 4 in the horizontal direction.

Two permanent magnets 53 are placed with different poles facing each other. For example, the north pole of permanent magnet 53 on the left side (the first magnet) is directed to the right, and the south pole of permanent magnet 53 on the right side (the second magnet) is directed to the left. Two permanent magnets 53 apply, to the space between two permanent magnets 53 in the horizontal direction, a magnetic field extending in the horizontal direction. Furthermore, the magnetic field also extends around movable contactor 3 (for example, in front of movable contactor 3).

(2.13) Two Bridge Parts

Next, two bridge parts 54 will be described with reference to FIG. 2 and FIG. 3. Two bridge parts 54 are formed of a magnetic material. Each bridge part 54 is in the "U" shape as viewed in the vertical direction. One of two bridge parts 54 is positioned in front of movable contactor 3, and the other is positioned behind movable contactor 3. One of two bridge parts 54 faces two permanent magnets 53 in the horizontal direction. Two bridge parts 54 are disposed so as to bridge the space between two permanent magnets 53. Furthermore, one of two bridge parts 54 holds two permanent magnets 53. Two bridge parts 54 form a ring-shaped magnetic circuit with two permanent magnets 53.

(2.14) Blocking Member

Blocking member 55 has electrical insulating properties. The material of blocking member 55 is, for example, a ceramic or a synthetic resin. Blocking member 55 is housed in housing chamber 510 of case 51.

In contact device 10, there are cases where an electric arc is generated between first movable contact 31 and first fixed contact 211 and between second movable contact 32 and second fixed contact 221 during movement of movable contactor 3 from the closed position to the open position. Providing blocking member 55 results in restricting the range where the electric arc extends.

(2.15) Electromagnet Device

As illustrated in FIG. 2, electromagnet device 7 includes coil 71, coil bobbin 72, movable core 73, yoke 74, return spring 75, cylindrical member 76, and bush 77. Furthermore, electromagnet device 7 includes a pair of coil terminals T1 (refer to FIG. 3) to which both ends of coil 71 are connected. The material of each coil terminal T1 is an electrically conductive material such as copper.

Coil bobbin 72 is formed of a synthetic resin, for example. Coil bobbin 72 includes first flange portion 721, second flange portion 722, and cylindrical portion 723. Coil 71 is wound around cylindrical portion 723. First flange portion 721 extends from the upper end of cylindrical portion 723 outward in the radial direction of cylindrical portion 723. Second flange portion 722 extends from the lower end of cylindrical portion 723 outward in the radial direction of cylindrical portion 723.

Cylindrical member 76 is in the shape of a cylinder having a lower surface. Cylindrical member 76 is housed in cylindrical portion 723 of coil bobbin 72.

Movable core 73 is formed of a magnetic material. Movable core 73 is in the shape of a cylinder. Movable core 73 is housed in cylindrical member 76. Shaft 78 extends through the inside of movable core 73, and movable core 73 and shaft 78 are connected. Movable core 73 includes recess 731 depressed downward from the upper surface of movable core 73.

Yoke 74 forms at least a portion of the magnetic circuit that allows passage of the magnetic flux generated at coil 71 when coil 71 is energized. Yoke 74 includes first yoke 741, second yoke 742, and two third yokes 743. Each of first yoke 741, second yoke 742, and two third yokes 743 is formed in the shape of a board.

First yoke 741 is disposed between movable contactor 3 and coil 71 as viewed in the vertical direction. First yoke 741 is in contact with the upper surface of first flange portion 721 of coil bobbin 72. First yoke 741 is in the shape of a rectangular board. First yoke 741 has insertion hole 744 in a central portion. Shaft 78 extends through insertion hole 744.

Second yoke 742 is in contact with the lower surface of second flange portion 722 of coil bobbin 72. One of two third yokes 743 extends from the left end of second yoke 742 to first yoke 741. The other of two third yokes 743 extends from the right end of second yoke 742 to first yoke 741.

Return spring 75 is, for example, a helical compression spring. A first end of return spring 75 in the stretching direction (the vertical direction) is in contact with first yoke 741, and a second end of return spring 75 in the stretching direction (the vertical direction) is in contact with the bottom surface of recess 731 of movable core 73. Return spring 75 applies an elastic force to movable core 73 to move movable core 73 downward.

Shaft 78 is in the shape of a round rod. The axial direction of shaft 78 is the vertical direction. The upper end of shaft 78 is connected to connecting portion 643 (refer to FIG. 6) of resin member 64. The lower end of shaft 78 is connected to movable core 73. When movable core 73 moves in the vertical direction, shaft 78, resin member 64, holder 60, movable contactor 3 held by holder 60, and yoke 61 move together in the vertical direction. In other words, shaft 78 causes movable contactor 3 to contact and separate from first fixed contact 211 and second fixed contact 221.

Bush 77 is formed of a magnetic material. Bush 77 is in the shape of a cylinder. Bush 77 is disposed between the inner peripheral surface of coil bobbin 72 and the outer peripheral surface of cylindrical member 76. Together with movable core 73 and yoke 74, bush 77 forms a magnetic circuit that allows passage of the magnetic flux generated when coil 71 is energized.

When coil 71 is energized, the magnetic flux generated at coil 71 passes through the aforementioned magnetic circuit, and thus movable core 73 moves so that the magnetic resistance of the aforementioned magnetic circuit is reduced. Specifically, during energization of coil 71, movable core 73 moves upward so as to fill the gap between first yoke 741 and movable core 73. More specifically, an electromagnetic force that is exerted to move movable core 73 upward exceeds the force (elastic force) of return spring 75 that pushes movable core 73 downward; thus, movable core 73 moves upward. Accordingly, shaft 78, holder 60, and movable contactor 3 move upward. Thus, movable contactor 3 moves to the closed position. The elastic force of spring 65 ensures the contact pressure between movable contactor 3 and each of first fixed contact 211 and second fixed contact 221.

When coil 71 changes from the energized state into the de-energized state, there is no longer the electromagnetic force that moves movable core 73 upward, and thus movable core 73 moves downward with the elastic force of return spring 75. Accordingly, shaft 78, holder 60, and movable contactor 3 move downward. Thus, movable contactor 3 moves to the open position.

(2.16) Behavior of Electric Arc

There are cases where an electric arc is generated between first movable contact 31 and first fixed contact 211 and between second movable contact 32 and second fixed contact 221 during movement of movable contactor 3 from the closed position to the open state.

Figure 9:
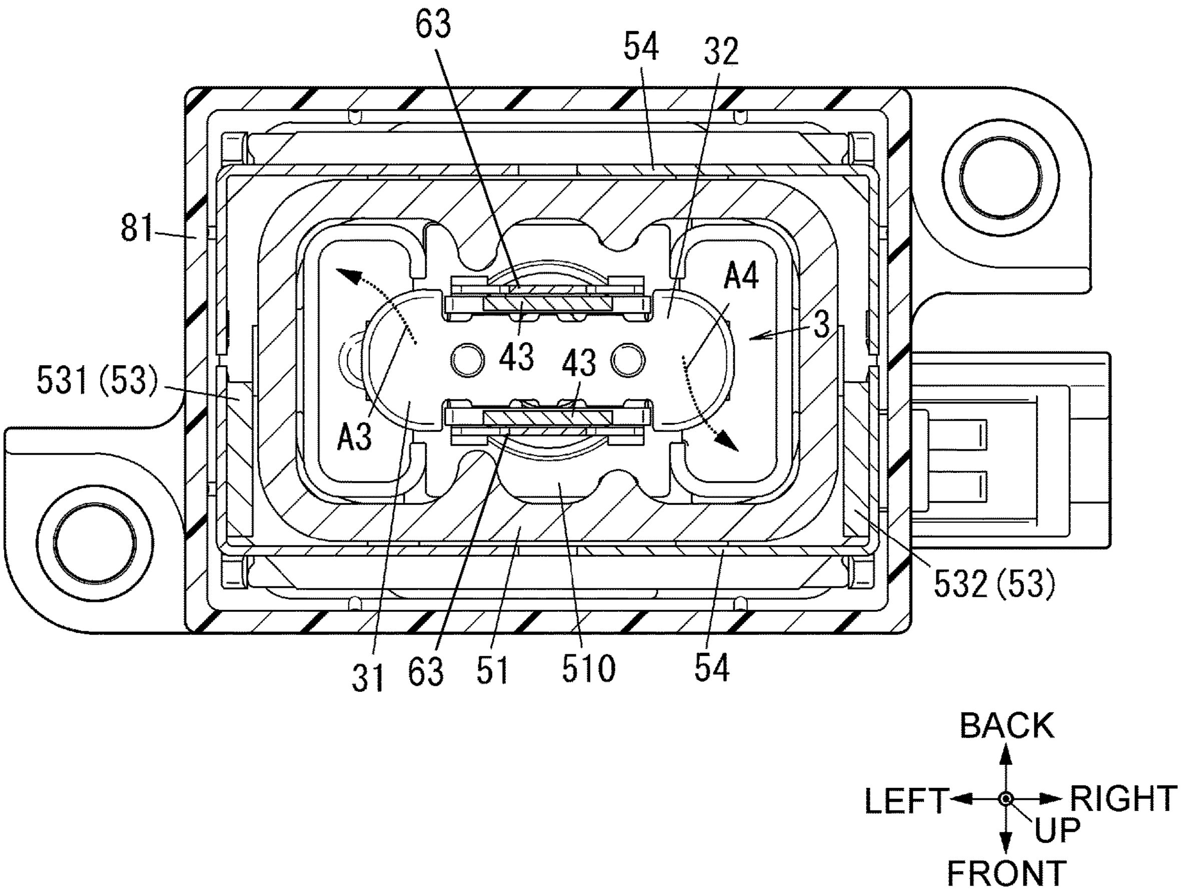
FIG. 9 is a cross-sectional view taken along line B-B of FIG. 1.

As illustrated in FIG. 9, in the depth direction, the width of each of two permanent magnets 53 is less than or equal to the outer width of case 51. The rear end of each of two permanent magnets 53 is located forward of the center of case 51 (movable contactor 3) as viewed in the depth direction. Two permanent magnets 53 apply, to the space in front of movable contactor 3 and areas around the space, a magnetic field that extends in the horizontal direction. The electric arc generated between first movable contact 31 and first fixed contact 211 is drawn in the direction indicated by arrow A3 (backward to the left), for example, with the Lorentz force. The electric arc generated between second movable contact 32 and second fixed contact 221 is drawn in the direction indicated by arrow A4 (forward to the right), for example, with the Lorentz force. When first magnet 531 is disposed in the left front area relative to first movable contact 31 and second magnet 532 is disposed in the right front area relative to second movable contact 32, the electric arc can be drawn diagonally in the depth and horizontal directions, as illustrated in FIG. 9. In other words, when first magnet 531 is disposed in the left front area relative to first movable contact 31 and second magnet 532 is disposed in the right front area relative to second movable contact 32, the electric arc can be more elongated than when the electric arc is drawn in the depth direction or the horizontal direction, allowing for improved arc-extinguishing performance.

In other words, the positional relationship between each of first magnet 531 and second magnet 532 and side plates 63 of holder 60 is as follows. Two side plates 63 of holder 60 face each other, front side plate 63 is located between first magnet 531 and second magnet 532, and first magnet 531 and second magnet 532 are located closer to front side plate 53 than to rear side plate 63.

(3) Advantageous Effects

As described above, electromagnetic relay 1 according to the present exemplary embodiment includes contact device 10 and electromagnet device 7. Contact device 10 includes fixed terminal unit 2 (first fixed terminal 21 and second fixed terminal 22), movable contactor 3, spring 65, resin member 64, and holder 60. The upper end of spring 65 is in contact with movable contactor 3, and the lower end of spring 65 is in contact with exposed portion 621 of holder 60. Holder 60 has a higher thermal conductivity than resin member 64. Furthermore, electromagnet device 7 causes movable contactor 3 to contact and separate from fixed terminal unit 2. For example, as compared to the case where the lower end of spring 65 is in contact with resin member 64 only, contact device 10 can be provided with improved heat dissipation.

Holder 60 is formed of a metal. Since a metal generally has a higher thermal conductivity than a resin or the like, contact device 10 can be provided with further improved heat dissipation. Furthermore, as compared to the case where holder 60 is formed of a resin, for example, holder 60 can be provided with improved heat resistance and improved durability.

Spring 65 is a helical spring, and exposed portion 621 is ring-shaped. When the shapes of spring 65 and exposed portion 621 match each other, there is a large area of contact between spring 65 and exposed portion 621, and heat can be easily dissipated from spring 65 to exposed portion 621.

Resin member 64 includes base 640 and first protrusion 641. First protrusion 641 protrudes upward from base 640. First protrusion 641 is located in the hollow area of spring 65. Since first protrusion 641 is located in the hollow area of spring 65, misalignment of spring 65 can be reduced.

Contact device 10 includes yoke 61. Yoke 61 is provided above movable contactor 3. Two welding traces A1, A2 between yoke 61 and holder 60 extend along the edges of yoke 61 in the horizontal direction. Since yoke 61 and holder 60 are welded together along the edges of yoke 61, yoke 61 and holder 60 can be joined together with improved strength as compared to the case where yoke 61 and holder 60 are locally welded, for example.

Holder 60 is formed from a single member. For example, as compared to the case where bottom 62 includes two bottom plates, there is a large area of contact between spring 65 and bottom 62, and heat can be easily dissipated from spring 65 to bottom 62.

Yoke 61 is configured to vertically move together with movable contactor 3. Yoke 61 includes protrusion 611. Protrusion 611 protrudes toward movable contactor 3. For example, during downward movement of yoke 61, protrusion 611 comes into contact with movable contactor 3 first and thus, wobble of movable contactor 3 due to contact between a corner of yoke 61 and movable contactor 3 can be reduced.

Movable contactor 3 moves upward to contact fixed terminal unit 2 and moves downward to separate from fixed terminal unit 2. Protrusion 611 of yoke 61 comes into contact with movable contactor 3 when movable contactor 3 moves downward. During downward movement of yoke 61, protrusion 611 comes into contact with movable contactor 3 first and thus, wobble of movable contactor 3 due to contact between a corner of yoke 61 and movable contactor 3 can be reduced.

Contact device 10 includes shaft 78 (a movable shaft). Shaft 78 causes movable contactor 3 to contact and separate from fixed terminal unit 2. At least a portion of protrusion 611 of yoke 61 vertically overlaps the movable shaft. The center of gravity of movable contactor 3 is generally located on a portion where shaft 78 and movable contactor 3 vertically overlap each other. For example, during downward movement of yoke 61 and movable contactor 3, protrusion 611 of yoke 61 comes into contact with an area around the center of gravity of movable contactor 3 first and thus, it is possible to further reduce wobble of movable contactor 3.

Contact device 10 includes two permanent magnets 53 (first magnet 531 and second magnet 532). Fixed terminal unit 2 includes first fixed terminal 21 and second fixed terminal 22. First fixed terminal 21 includes first fixed contact 211. Second fixed terminal 22 is located to the right of first fixed terminal 21 and includes second fixed contact 221. Movable contactor 3 includes first movable contact 31 and second movable contact 32. First movable contact 31 is located below first fixed contact 211. Second movable contact 32 is located below second fixed contact 221. First magnet 531 is located in the left front area relative to first movable contact 31. Second magnet 532 is located in the right front area relative to second movable contact 32. An electric arc that may be generated when first movable contact 31 and second movable contact 32 separate from first fixed contact 211 and second fixed contact 221, respectively, is drawn diagonally in the depth and horizontal directions, allowing for improved arc-extinguishing performance.

(4) Variations

The above-described exemplary embodiment is merely one of various exemplary embodiments of the present disclosure. Various changes can be made to the above-described exemplary embodiment according to the design or the like as long as the object of the present disclosure can be achieved.

Holder 60 is preferably formed of a high thermal conductive resin having a higher thermal conductivity than resin member 64.

Holder 60 is preferably formed from a single member, but does not necessarily need to be formed from a single member. For example, bottom 62 may be formed of a metal, and the pair of side plates 63 may be formed of a resin.

It is not essential that holder 60 be integrally formed. For example, holder 60 may be replaced by a pair of holders obtained by dividing holder 60 in half horizontally along a line passing through the depth-wise center thereof. Alternatively, holder 60 may be replaced by a pair of holders obtained by dividing holder 60 in half depth-wise along a line passing through the horizontal center thereof.

Two permanent magnets 53 may be located in the back area relative to movable contactor 3. Specifically, one of two permanent magnets 53 (first magnet 531) may be located in the left back area relative to first movable contact 31. The other of two permanent magnets 53 (second magnet 532) may be located in the right back area relative to second movable contact 32.

The number of permanent magnets 53 is not limited to two and may be one or may be three or more.

SUMMARY

As described above, contact device 10 according to the first aspect includes: first fixed terminal 21; movable contactor 3 configured to contact first fixed terminal 21 and separate from first fixed terminal 21; spring 65 disposed below movable contactor 3 and formed of a metal; and holder 60 including bottom 62 and disposed to position bottom 62 below spring 65; and resin member 64 configured to cover a portion of bottom 62 of the holder. Holder 60 has a higher thermal conductivity than a thermal conductivity of resin member 64, an upper surface of bottom 62 of holder 60 includes exposed portion 621 that is exposed from resin member 64, and spring 65 is in contact with exposed portion 621 of bottom 62.

According to this aspect, for example, as compared to the case where the lower end of spring 65 is in contact with resin member 64 only, contact device 10 can be provided with improved heat dissipation.

In contact device 10 according to the second aspect, holder 60 is formed of a metal.

According to this aspect, since a metal generally has a higher thermal conductivity than a resin or the like, contact device 10 can be provided with further improved heat dissipation. Furthermore, as compared to the case where holder 60 is formed of a resin, for example, holder 60 can be provided with improved heat resistance and improved durability.

In contact device 10 according to the third aspect, spring 65 is a helical spring. Exposed portion 621 is ring-shaped.

According to this aspect, there is a large area of contact between spring 65 and exposed portion 621, and heat can be easily dissipated from spring 65 to exposed portion 621.

In contact device 10 according to the fourth aspect, spring 65 is a helical spring, and resin member 64 includes: base 640; and first protrusion 641 protruding upward from base 640. First protrusion 641 is disposed inside of spring 65 as viewed from above.

According to this aspect, since first protrusion 641 is located inside spring 65 (the helical spring), misalignment of the helical spring can be reduced.

Contact device 10 according to the fifth aspect further includes: yoke 61 provided above movable contactor 3, and holder 60 further includes two side plates 63 connected by bottom 62, yoke 61 is welded to each of two side plates 63, welding trace A1 between yoke 61 and one of two side plates 63 extends along an edge of yoke 61 that faces one of two side plates 63, and welding trace A2 between yoke 61 and the other of two side plates 63 extends along an edge of yoke 61 that faces the other of two side plates 63.

According to this aspect, since yoke 61 and holder 60 are welded together along the edges of yoke 61, yoke 61 and holder 60 can be joined together with improved strength.

Contact device 10 according to the sixth aspect further includes yoke 61 disposed above movable contactor 3, and yoke 61 is configured to vertically move together with movable contactor 3 and includes protrusion 611 protruding toward movable contactor 3.

According to this aspect, for example, during downward movement of yoke 61, protrusion 611 comes into contact with movable contactor 3 first and thus, wobble of movable contactor 3 due to contact between a corner of yoke 61 and movable contactor 3 can be reduced.

In contact device 10 according to the seventh aspect, holder 60 is formed by bending a single member.

According to this aspect, as compared to the case where bottom 62 includes two bottom plates, for example, there is a large area of contact between spring 65 and bottom 62, and heat can be easily dissipated from spring 65 to bottom 62.

In the contact device according to the eighth aspect, first fixed terminal 21 is provided above movable contactor 3, and when movable contactor 3 moves upward, movable contactor 3 contacts first fixed terminal 21, and when movable contactor 3 moves downward, movable contactor 3 separates from first fixed terminal 21, and when movable contactor 3 moves downward, protrusion 611 of yoke 61 contacts movable contactor 3.

According to this aspect, during downward movement of yoke 61, protrusion 611 comes into contact with movable contactor 3 first and thus, wobble of movable contactor 3 due to contact between a corner of yoke 61 and movable contactor 3 can be reduced.

Contact device 10 according to the ninth aspect further includes shaft 78 configured to cause movable contactor 3 to contact first fixed terminal 21 and cause movable contactor 3 to separate from first fixed terminal 21, and shaft 78 is disposed to overlap protrusion 611 of the yoke as viewed from above.

According to this aspect, at least a portion of protrusion 611 overlaps the movable shaft (shaft 78), and thus wobble of movable contactor 3 can be further reduced.

Contact device 10 according to the tenth aspect further includes: first magnet 531; second magnet 532 disposed with an opposite pole facing first magnet 531; and second fixed terminal 22, and holder 60 further includes two side plates 63, bottom 62 is connected to two side plates 63, two side plates 63 face each other, one of two side plates 63 is located between first magnet 531 and second magnet 532, and each of first magnet 531 and second magnet 532 is located closer to one of two side plates 63 than to the other of two side plates 63.

According to this aspect, an electric arc that is generated when first movable contact 31 separates from first fixed contact 211 and an electric arc that is generated when second movable contact 32 separates from second fixed contact 221 are drawn diagonally in the depth and horizontal directions, allowing for improved arc-extinguishing performance.

Features other than the first aspect are not essential to contact device 10 and can be omitted as appropriate.

Electromagnetic relay 1 according to the eleventh aspect includes: contact device 10 according to any one of the first to tenth aspects; and electromagnet device 7. Electromagnet device 7 causes movable contactor 3 to contact first fixed terminal 21 and causes movable contactor 3 to separate from first fixed terminal 21.

According to this aspect, for example, as compared to the case where the lower end of spring 65 is in contact with resin member 64 only in contact device 10, contact device 10 can be provided with improved heat dissipation.

REFERENCE SIGNS LIST

1 electromagnetic relay
10 contact device
21 first fixed terminal
211 first fixed contact
22 second fixed terminal
221 second fixed contact
3 movable contactor
30 movable contactor body
31 first movable contact
32 second movable contact
531 first magnet
532 second magnet
60 holder
61 yoke
611 protrusion
62 bottom
621 exposed portion
622 first hole
623 second hole
63 side plate
64 resin member
640 base
641 first protrusion
642 second protrusion
65 spring
75 return spring
7 electromagnet device
75 return spring
78 shaft
A1, A2 welding trace

The invention claimed is:

1. A contact device comprising:
a first fixed terminal;
a movable contactor configured to contact the first fixed terminal and separate from the first fixed terminal;
a spring disposed below the movable contactor and formed of a metal;
a holder including a bottom and disposed to position the bottom below the spring; and
a resin member configured to cover a portion of the bottom of the holder, wherein
the holder has a higher thermal conductivity than a thermal conductivity of the resin member,
an upper surface of the bottom of the holder includes an exposed portion that is exposed from the resin member,
the spring is in contact with the exposed portion of the bottom,
the spring is a helical spring,
the resin member includes:
a base; and
a protrusion protruding upward from the base, and
the protrusion is disposed inside the helical spring as viewed from above.

2. The contact device according to claim 1, wherein the holder is formed of a metal.

3. The contact device according to claim 1, wherein the exposed portion is ring-shaped.

4. The contact device according to claim 1, further comprising:
a yoke provided above the movable contactor, wherein
the holder further includes a first side plate and a second side plate connected by the bottom,
the yoke is welded to the first side plate and the second side plate,
a welding trace between the yoke and the first side plate extends along a first edge of the yoke, the first edge facing the first side plate, and
a welding trace between the yoke and the second side plate extends along a second edge of the yoke, the second edge facing the second side plate.

5. The contact device according to claim 1, further comprising:
a yoke disposed above the movable contactor, wherein
the yoke is configured to vertically move together with the movable contactor, and
the yoke includes a protrusion protruding toward the movable contactor.

6. The contact device according to claim 5, wherein
the first fixed terminal is provided above the movable contactor,
as the movable contactor moves upward, the movable contactor contacts the first fixed terminal, and as the movable contactor moves downward, the movable contactor separates from the first fixed terminal, and
as the movable contactor moves downward, the protrusion of the yoke contacts the movable contactor.

7. The contact device according to claim 5, further comprising:
a movable shaft configured to cause the movable contactor to contact the first fixed terminal and cause the movable contactor to separate from the first fixed terminal, wherein
the movable shaft is disposed to overlap the protrusion of the yoke as viewed from above.

8. The contact device according to claim 1, wherein the holder is formed by bending a single member.

9. The contact device according to claim 1, further comprising:
a first magnet;
a second magnet disposed with an opposite pole facing the first magnet; and
a second fixed terminal, wherein
the holder further includes a first side plate and a second side plate,
the bottom is connected to the first side plate and the second side plate,
the first side plate and the second side plate face each other,
the first side plate is located between the first magnet and the second magnet, and
each of the first magnet and the second magnet is located closer to the first side plate than to the second side plate.

10. An electromagnetic relay comprising:
the contact device according to claim 1; and
an electromagnet device configured to cause the movable contactor to contact the first fixed terminal and cause the movable contactor to separate from the first fixed terminal.

11. A contact device comprising:

a first fixed terminal;

a movable contactor configured to contact the first fixed terminal and separate from the first fixed terminal;

a spring disposed below the movable contactor and formed of a metal;

a holder including a bottom and disposed to position the bottom below the spring;

a resin member configured to cover a portion of the bottom of the holder; and a yoke disposed above the movable contactor, wherein:

the holder has a higher thermal conductivity than a thermal conductivity of the resin member, an upper surface of the bottom of the holder includes an exposed portion that is exposed from the resin member, the spring is in contact with the exposed portion of the bottom the yoke is configured to vertically move together with the movable contactor, and the yoke includes a protrusion protruding toward the movable contactor.

12. The contact device according to claim 11, wherein the holder is formed of a metal.

13. The contact device according to claim 11, wherein the spring is a helical spring, and the exposed portion is ring-shaped.

14. The contact device according to claim 11, wherein the holder is formed by bending a single member.

* * * * *